United States Patent

[11] 3,632,039

| [72] | Inventor | Robert Gayle<br>Wilton, Conn. |
|---|---|---|
| [21] | Appl. No. | 66,850 |
| [22] | Filed | Aug. 25, 1970 |
| [45] | Patented | Jan. 4, 1972 |
| [73] | Assignee | National Patent Development Corporation<br>New York, N.Y. |

[54] LAUNDRY BAG
4 Claims, 4 Drawing Figs.

[52] U.S. Cl. .................................................. 229/53,
150/1, 220/DIG. 30
[51] Int. Cl. ........................................................ B65d 33/00
[50] Field of Search ............................................. 150/1;
220/DIG. 30; 229/53

[56] References Cited
UNITED STATES PATENTS
3,347,297  10/1967  Garland ........................ 150/1

Primary Examiner—Donald F. Norton
Attorney—Cushman, Darby & Cushman

ABSTRACT: A disposable bag is made of a plurality of pieces of water-insoluble polymer joined by a water-soluble adhesive. When the bag is employed, for example as a laundry bag thrown into a washer, it comes apart in the water. Preferably the bag is heat shrinkable so that its volume is reduced when it is placed in the water. The bag can contain a germicide as a coating or dispersed throughout the polymer.

PATENTED JAN 4 1972

3,632,039

INVENTOR
ROBERT GAYLE

BY Cushman, Darby & Cushman
ATTORNEYS

LAUNDRY BAG

The present invention relates to a novel disposable bag for laundry and the like.

It is an object of the present invention to make a sterile, water-disintegrating plastic bag.

It is, of course, old to make packages of completely water-soluble polymers, e.g., see Hardt U.S. Pat. No. 2,936,263 and Dunlop U.S. Pat. No. 3,198,740. Such packages, however, run the risk of dissolving upon inadvertent premature contact with water.

According to the present invention, such danger is reduced by making a water-disintegrating bag which is preferably sterile by making the bag of a plurality of pieces of a water-insoluble polymer joined by a water-soluble adhesive. The adhesive can serve to seal the bag at either or both of its extremities and/or on one or more sides. The adhesive can take the form of a paste, latex emulsion, etc., and can be made of polyvinyl alcohol, carboxymethyl cellulose, methyl cellulose, polyvinyl methyl ether, starch, dextrin or other material which dissolves or disintegrates in water. The adhesive can be applied directly to the plastic surfaces before joining or as a tape to be used in joining the surfaces of the bag together when it is formed.

The bag is particularly useful as a disposable device for home, hospital or other institutional laundry.

The adhesive or tape when subjected to water dissolves or disintegrates and the bag comes apart in the wash cycle, allowing its enclosed contents to spill into the wash water.

The bag can be made of any conventional water-insoluble film-forming polymer such as nylon, polyethylene, polypropylene, polystyrene, ethylene-propylene copolymer, ethylene-butene-1 copolymer, polyvinyl chloride, vinyl chloride-vinyl acetate copolymer, saran (vinylidene chloride copolymer with acrylonitrile or vinyl chloride, for example), polyethylene terephthalate or other polyester, polyacrylonitrile, vinyl chloride-acrylonitrile copolymer, etc.

It is particularly advantageous to make the bag of a biaxially oriented polymer film such as biaxially oriented polyethylene terephthalate, biaxially oriented polystyrene, biaxially oriented polypropylene, biaxially oriented cross-linked polyethylene, e.g., polyethylene which has been irradiated to an extent of 4–20 megarad and then oriented, e.g., see Baird U.S. Pat. No. 3,022,543, or polyethylene which has been oriented after being cross-linked by peroxide. Generally the orientation is such as to stretch the polymer 100 to 600 percent in both directions, but this can be varied. Since the orientation is normally put in by heat stretching, e.g., at 60° to 150° C., when the bag is subjected to the hot water in the wash cycle the bag shrinks materially, reducing its volume from its original size and shape. Furthermore, the stresses set up during the shrinking of the bag aid the water-soluble adhesive in its rapid disintegration.

It is particularly advantageous to make the bag of a bactericide which can be added to the bag forming ingredients during the extrusion cycle or coated on the bag substrate during or after manufacture. Examples of such germicides include hexachlorophene, cetyl pyridinium ammonium chloride, trimethyl benzyl ammonium bromide, bis(tributyltin) sulfosalicylate, bacitracin, 3,4,4'-trichlorocarbanilide, sulfanilamide. Other conventional germicides can also be employed. The germicides render the materials inside the bag, when in use, reasonably harmless as long as the bag remains sealed, since the micro-organisms cannot penetrate either the bactericidal coating layer on the bag or the bag itself when the germicide is added prior to extrusion.

The invention will be understood best in connection with the drawings wherein

Figure 1:
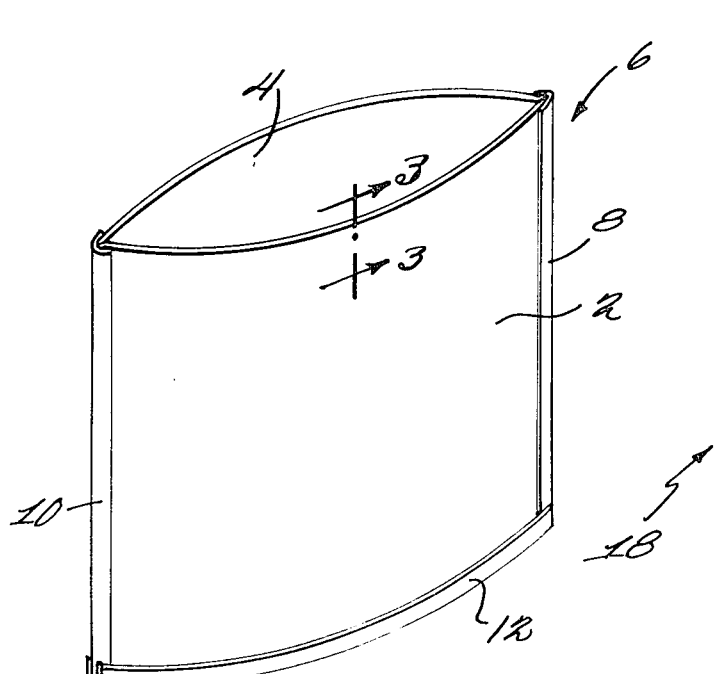
FIG. 1 is a perspective view of one form of bag according to the invention.

Referring more specifically to FIG. 1 of the drawings, there is provided a bag 6, e.g., of biaxially oriented polyvinyl chloride (stretched 400 percent in each direction) having front wall 2 and backwall 4. The walls are joined by adhesive tapes 8 and 10 along their sides and tape 12 at their bottom. The tapes serve as seams. All three tapes are made of water-soluble polyvinyl alcohol. The inner surface 14 of the wall 2 (as well as the inner surface of wall 4) is provided with a coating 16 containing hexachlorophene.

Figure 2:
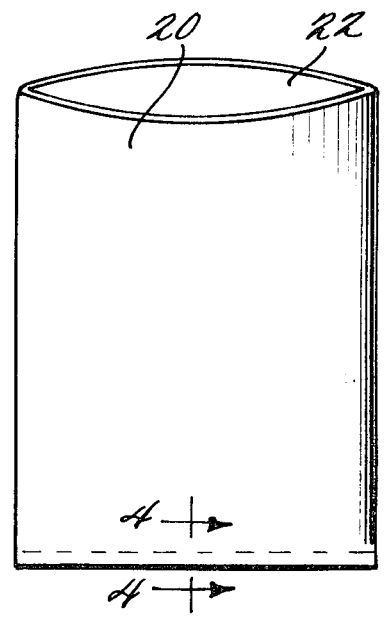
FIG. 2 is a vertical elevation of another type of bag within the invention.
Figure 3:
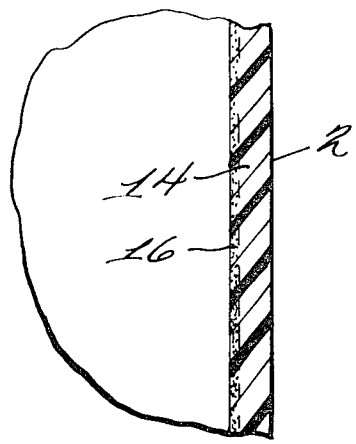
FIG. 3 is a sectional view along the line 3—3 of FIG. 1.
Figure 4:
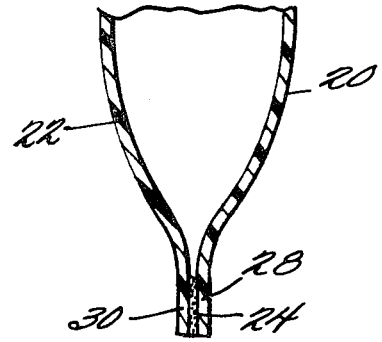
FIG. 4 is a sectional view along the line of 4—4 of FIG. 2.

As shown in FIG. 2, laundry bag 18 comprises front wall 20 and rear wall 22 of biaxially oriented irradiated polyethylene stretched 450 percent in both directions. The two walls are joined at their bottom edges 28 and 30 by water-soluble adhesive 24, e.g., dextrin.

When the bags are filled with laundry, they are thrown into the washer. The bags will then disintegrate due to the fact that the water-soluble adhesive dissolves. The shrinkage of the material of the bag walls also aids in this disintegration. The residual small amount of bag material left after the washing is complete can be readily disposed of. In a specific example, a laundry bag made of biaxially oriented irradiated polyethylene 6 megarad irradiation stretched 350 percent in both directions at 85° C. and having a polyvinyl alcohol bottom seam was disintegrated in wash water at 90° C.

While the bags, as illustrated, are made of two pieces of plastic, they can be made of three, four or more pieces. While the tops of the bags are shown as open, they can be closed by an conventional means once they are filled with laundry or the like.

The wash water, of course, can contain conventional washing agents such as detergents, soap, bleach, etc.

For maximum shrinkage of the biaxially oriented heat-shrinkable polymer, the temperature of the wash water should be at least nearly as high as the temperature of heat stretching the polymer. Thus, if the polymer is stretched (biaxially oriented) at 80° C., then the wash water preferably has a temperature of 80° C., although there still will be considerable shrinkage if the wash water has a temperature of only 70° C.

What is claimed is:

1. A disposable water-disintegrating plastic bag comprising wall means made of a plurality of pieces of a water-insoluble polymer joined by a water-soluble adhesive whereby the bag will disintegrate into a plurality of pieces when placed in water.

2. A bag according to claim 1 wherein the polymer is a biaxially oriented heat-shrinkable polymer.

3. A bag according to claim 2 having a germicide dispersed therethrough or coated on a wall surface thereof.

4. A bag according to claim 3 having laundry therein.

* * * * *